(12) United States Patent
Bell

(10) Patent No.: US 8,098,277 B1
(45) Date of Patent: Jan. 17, 2012

(54) SYSTEMS AND METHODS FOR COMMUNICATION BETWEEN A REACTIVE VIDEO SYSTEM AND A MOBILE COMMUNICATION DEVICE

(75) Inventor: Matthew Bell, Palo Alto, CA (US)

(73) Assignee: Intellectual Ventures Holding 67 LLC, Las Vegas, NV (US)

( * ) Notice: Subject to any disclaimer, the term of this patent is extended or adjusted under 35 U.S.C. 154(b) by 1401 days.

(21) Appl. No.: 11/634,044

(22) Filed: Dec. 4, 2006

Related U.S. Application Data

(60) Provisional application No. 60/817,278, filed on Jun. 28, 2006, provisional application No. 60/741,557, filed on Dec. 2, 2005.

(51) Int. Cl.
*H04N 9/47* (2006.01)

(52) U.S. Cl. .......................................... 348/61
(58) Field of Classification Search ............ 348/61
See application file for complete search history.

(56) References Cited

U.S. PATENT DOCUMENTS

| | | |
|---|---|---|
| 2,917,980 A | 12/1959 | Grube et al. |
| 3,068,754 A | 12/1962 | Benjamin et al. |
| 3,763,468 A | 10/1973 | Ovshinsky et al. |
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |
| 5,426,474 A | 6/1995 | Rubtsov et al. |
| 5,436,639 A | 7/1995 | Arai et al. |
| 5,442,252 A | 8/1995 | Golz |
| 5,454,043 A | 9/1995 | Freeman |
| 5,497,269 A | 3/1996 | Gal |
| 5,510,828 A | 4/1996 | Lutterbach et al. |
| 5,526,182 A | 6/1996 | Jewell et al. |
| 5,528,263 A | 6/1996 | Platzker et al. |

(Continued)

FOREIGN PATENT DOCUMENTS

EP 0055366 7/1982

(Continued)

OTHER PUBLICATIONS

Jun Rekimoto; SmartSkin: An Infrastructure for Freehand Manipulation on Interactive Surfaces; 2002.*

(Continued)

*Primary Examiner* — Jerry Dennison
(74) *Attorney, Agent, or Firm* — Knobbe Martens Olson & Bear LLP

(57) ABSTRACT

Systems and methods are provided for communication between a reactive video engine and a mobile communication device. In a system according to one embodiment, a reactive video engine is coupled to a communication interface. The communication interface is configured to facilitate communication with the reactive video engine and a mobile communication device.

20 Claims, 6 Drawing Sheets

U.S. PATENT DOCUMENTS

| | | | |
|---|---|---|---|
| 5,528,297 A | 6/1996 | Seegert et al. | |
| 5,534,917 A | 7/1996 | MacDougall | |
| 5,548,694 A | 8/1996 | Gibson | |
| 5,591,972 A | 1/1997 | Noble et al. | |
| 5,594,469 A | 1/1997 | Freeman et al. | |
| 5,633,691 A | 5/1997 | Vogeley et al. | |
| 5,703,637 A | 12/1997 | Miyazaki et al. | |
| 5,808,784 A | 9/1998 | Ando et al. | |
| 5,861,881 A | 1/1999 | Freeman et al. | |
| 5,882,204 A | 3/1999 | Iannazo et al. | |
| 5,923,380 A | 7/1999 | Yang et al. | |
| 5,923,475 A | 7/1999 | Kurtz et al. | |
| 5,953,152 A | 9/1999 | Hewlett | |
| 5,969,754 A | 10/1999 | Zeman | |
| 5,978,136 A | 11/1999 | Ogawa et al. | |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao et al. | |
| 6,084,979 A | 7/2000 | Kanade et al. | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A | 9/2000 | Onda | |
| 6,166,744 A | 12/2000 | Jaszlics et al. | |
| 6,176,782 B1 | 1/2001 | Lyons et al. | |
| 6,191,773 B1 | 2/2001 | Maruno et al. | |
| 6,198,487 B1 | 3/2001 | Fortenbery et al. | |
| 6,198,844 B1 | 3/2001 | Nomura | |
| 6,263,339 B1 | 7/2001 | Hirsch | |
| 6,292,171 B1 | 9/2001 | Fu et al. | |
| 6,308,565 B1 | 10/2001 | French et al. | |
| 6,323,895 B1 | 11/2001 | Sata | |
| 6,333,735 B1 | 12/2001 | Anvekar | |
| 6,335,977 B1 | 1/2002 | Kage | |
| 6,339,748 B1 | 1/2002 | Hiramatsu | |
| 6,349,301 B1 | 2/2002 | Mitchell et al. | |
| 6,353,428 B1 | 3/2002 | Maggioni et al. | |
| 6,359,612 B1 | 3/2002 | Peter et al. | |
| 6,388,657 B1 | 5/2002 | Natoli | |
| 6,400,374 B2 | 6/2002 | Lanier | |
| 6,407,870 B1 | 6/2002 | Hurevich et al. | |
| 6,414,672 B2 | 7/2002 | Rekimoto et al. | |
| 6,445,815 B1 | 9/2002 | Sato | |
| 6,454,419 B2 | 9/2002 | Kitazawa | |
| 6,480,267 B2 | 11/2002 | Yanagi et al. | |
| 6,491,396 B2 | 12/2002 | Karasawa et al. | |
| 6,501,515 B1 | 12/2002 | Iwamura | |
| 6,522,312 B2 | 2/2003 | Ohshima et al. | |
| 6,545,706 B1 | 4/2003 | Edwards et al. | |
| 6,552,760 B1 | 4/2003 | Gotoh et al. | |
| 6,598,978 B2 | 7/2003 | Hasegawa | |
| 6,607,275 B1 | 8/2003 | Cimini et al. | |
| 6,611,241 B1 | 8/2003 | Firester | |
| 6,654,734 B1 | 11/2003 | Mani et al. | |
| 6,658,150 B2 | 12/2003 | Tsuji et al. | |
| 6,661,918 B1 | 12/2003 | Gordon et al. | |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 | 4/2004 | Pryor et al. | |
| 6,732,929 B2 | 5/2004 | Good et al. | |
| 6,747,666 B2 | 6/2004 | Utterback | |
| 6,752,720 B1 | 6/2004 | Clapper et al. | |
| 6,754,370 B1 | 6/2004 | Hall-Holt et al. | |
| 6,791,700 B2 | 9/2004 | Omura et al. | |
| 6,826,727 B1 | 11/2004 | Mohr et al. | |
| 6,831,664 B2 | 12/2004 | Marmaropoulos et al. | |
| 6,871,982 B2 | 3/2005 | Holman et al. | |
| 6,877,882 B1 | 4/2005 | Haven et al. | |
| 6,912,313 B2 | 6/2005 | Li | |
| 6,965,693 B1 | 11/2005 | Kondo et al. | |
| 6,975,360 B2 | 12/2005 | Slatter | |
| 6,999,600 B2 | 2/2006 | Venetianer et al. | |
| 7,015,894 B2 | 3/2006 | Morohoshi | |
| 7,042,440 B2 | 5/2006 | Pryor | |
| 7,054,068 B2 | 5/2006 | Yoshida et al. | |
| 7,058,204 B2 | 6/2006 | Hildreth et al. | |
| 7,068,274 B2 | 6/2006 | Welch et al. | |
| 7,069,516 B2 | 6/2006 | Rekimoto | |
| 7,088,508 B2 | 8/2006 | Ebina et al. | |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,289,130 B1 | 10/2007 | Satoh et al. | |
| 7,330,584 B2 | 2/2008 | Weiguo et al. | |
| 7,339,521 B2 | 3/2008 | Scheidemann et al. | |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,432,917 B2 * | 10/2008 | Wilson et al. | 345/175 |
| 7,536,032 B2 | 5/2009 | Bell | |
| 7,559,841 B2 | 7/2009 | Hashimoto | |
| 7,576,727 B2 | 8/2009 | Bell | |
| 7,598,942 B2 | 10/2009 | Underkoffler et al. | |
| 7,619,824 B2 | 11/2009 | Poulsen | |
| 7,665,041 B2 | 2/2010 | Wilson et al. | |
| 7,710,391 B2 | 5/2010 | Bell et al. | |
| 7,737,636 B2 | 6/2010 | Li et al. | |
| RE41,685 E | 9/2010 | Feldman et al. | |
| 7,809,167 B2 | 10/2010 | Bell | |
| 7,834,846 B1 | 11/2010 | Bell | |
| 2001/0012001 A1 | 8/2001 | Rekimoto et al. | |
| 2001/0033675 A1 | 10/2001 | Maurer et al. | |
| 2002/0006583 A1 | 1/2002 | Michiels et al. | |
| 2002/0032697 A1 | 3/2002 | French et al. | |
| 2002/0041327 A1 | 4/2002 | Hildreth et al. | |
| 2002/0064382 A1 | 5/2002 | Hildreth et al. | |
| 2002/0081032 A1 | 6/2002 | Chen et al. | |
| 2002/0103617 A1 | 8/2002 | Uchiyama et al. | |
| 2002/0105623 A1 | 8/2002 | Pinhanez | |
| 2002/0130839 A1 | 9/2002 | Wallace et al. | |
| 2002/0140633 A1 | 10/2002 | Rafii et al. | |
| 2002/0140682 A1 | 10/2002 | Brown et al. | |
| 2002/0178440 A1 | 11/2002 | Agnihotri et al. | |
| 2002/0186221 A1 | 12/2002 | Bell | |
| 2003/0032484 A1 | 2/2003 | Ohshima et al. | |
| 2003/0076293 A1 | 4/2003 | Mattsson | |
| 2003/0091724 A1 | 5/2003 | Mizoguchi | |
| 2003/0093784 A1 | 5/2003 | Dimitrova et al. | |
| 2003/0098819 A1 | 5/2003 | Sukthankar et al. | |
| 2003/0103030 A1 | 6/2003 | Wu | |
| 2003/0113018 A1 | 6/2003 | Nefian et al. | |
| 2003/0122839 A1 | 7/2003 | Matraszek et al. | |
| 2003/0137494 A1 | 7/2003 | Tulbert | |
| 2003/0161502 A1 | 8/2003 | Morihara et al. | |
| 2003/0178549 A1 | 9/2003 | Ray | |
| 2004/0005924 A1 | 1/2004 | Watabe et al. | |
| 2004/0015783 A1 | 1/2004 | Lennon et al. | |
| 2004/0046736 A1 | 3/2004 | Pryor et al. | |
| 2004/0046744 A1 | 3/2004 | Rafii et al. | |
| 2004/0073541 A1 | 4/2004 | Lindblad et al. | |
| 2004/0091110 A1 | 5/2004 | Barkans | |
| 2004/0095768 A1 | 5/2004 | Watanabe et al. | |
| 2004/0183775 A1 | 9/2004 | Bell | |
| 2005/0088407 A1 | 4/2005 | Bell et al. | |
| 2005/0089194 A1 | 4/2005 | Bell | |
| 2005/0104506 A1 | 5/2005 | Youh et al. | |
| 2005/0110964 A1 | 5/2005 | Bell et al. | |
| 2005/0122308 A1 | 6/2005 | Bell et al. | |
| 2005/0132266 A1 | 6/2005 | Ambrosino et al. | |
| 2005/0147282 A1 | 7/2005 | Fujii | |
| 2005/0162381 A1 | 7/2005 | Bell et al. | |
| 2005/0185828 A1 | 8/2005 | Semba et al. | |
| 2005/0195598 A1 | 9/2005 | Dancs et al. | |
| 2005/0265587 A1 | 12/2005 | Schneider | |
| 2006/0010400 A1 | 1/2006 | Dehlin et al. | |
| 2006/0031786 A1 | 2/2006 | Hillis et al. | |

| | | | |
|---|---|---|---|
| 2006/0132432 | A1 | 6/2006 | Bell |
| 2006/0139314 | A1 | 6/2006 | Bell |
| 2006/0168515 | A1 | 7/2006 | Dorsett, Jr. et al. |
| 2006/0184993 | A1 | 8/2006 | Goldthwaite et al. |
| 2006/0187545 | A1 | 8/2006 | Doi |
| 2006/0227099 | A1 | 10/2006 | Han et al. |
| 2006/0242145 | A1 | 10/2006 | Krishnamurthy et al. |
| 2006/0256382 | A1 | 11/2006 | Matraszek et al. |
| 2006/0258397 | A1* | 11/2006 | Kaplan et al. ............... 455/556.1 |
| 2006/0294247 | A1* | 12/2006 | Hinckley et al. ............... 709/228 |
| 2007/0285419 | A1 | 12/2007 | Givon |
| 2008/0040692 | A1 | 2/2008 | Sunday et al. |
| 2008/0062123 | A1 | 3/2008 | Bell |
| 2008/0090484 | A1 | 4/2008 | Lee et al. |
| 2008/0150890 | A1 | 6/2008 | Bell et al. |
| 2008/0150913 | A1 | 6/2008 | Bell et al. |
| 2008/0170776 | A1 | 7/2008 | Albertson et al. |
| 2008/0245952 | A1 | 10/2008 | Troxell et al. |
| 2008/0252596 | A1 | 10/2008 | Bell et al. |
| 2009/0027337 | A1 | 1/2009 | Hildreth |
| 2009/0077504 | A1 | 3/2009 | Bell et al. |
| 2009/0102788 | A1 | 4/2009 | Nishida et al. |
| 2009/0225196 | A1 | 9/2009 | Bell et al. |
| 2009/0235295 | A1 | 9/2009 | Bell et al. |
| 2009/0251685 | A1 | 10/2009 | Bell et al. |
| 2010/0026624 | A1 | 2/2010 | Bell et al. |
| 2010/0039500 | A1 | 2/2010 | Bell et al. |
| 2010/0060722 | A1 | 3/2010 | Bell |
| 2010/0121866 | A1 | 5/2010 | Bell et al. |

FOREIGN PATENT DOCUMENTS

| | | |
|---|---|---|
| EP | 0626636 | 11/1994 |
| EP | 0913790 | 5/1999 |
| EP | 1 689 172 A1 | 6/2002 |
| JP | 57094672 | 6/1982 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| KR | 2003-0058894 | 7/2003 |
| WO | WO 98/38533 | 9/1998 |
| WO | WO 00/16562 A1 | 3/2000 |
| WO | WO 2001/063916 | 8/2001 |
| WO | WO 02/01537 A2 | 1/2002 |
| WO | WO 2002/100094 | 12/2002 |
| WO | WO 2004/055776 | 7/2004 |
| WO | WO 2004/097741 A1 | 11/2004 |
| WO | WO 2005/041578 A2 | 5/2005 |
| WO | WO 2005/041579 A2 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Yang Xiao; Throughput and Delay Limits of IEEE 802.11; Aug. 2002.*
Rekimoto, J. and Matsushita, N., "Perceptual Surfaces: Towards a Human and Object Sensitive Interactive Display," 1997, Proc. of the Workshop on Perceptual User Interfaces, Banff, Canada, pp. 30-32.
Pinhanez, C., "The Everywhere Displays Projector: A Device to Create Ubiquitous Graphical Interfaces," 2001, Proc. of the UbiComp 2001 Conference, Ubiquitous Computing Lecture Notes in Computer Science, Springer-Verlag, Berlin, Germany, pp. 315-331.
Kjeldsen, R. et al., "Interacting with Steerable Projected Displays," 2002, Proc. of the 5th International Conference on Automatic Face and Gesture Recognition, Washington, D.C.
Pinhanez, C. et al., "Ubiquitous Interactive Graphics," 2002, IBM Research Report RC22495, available at <http://www.research.ibm.com/ed/publications/rc22495.pdf>.
Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.
Sparacino, Flavia et al., "Media in performance: interactive spaces for dance, theater, circus and museum exhibits," 2000, IBM Systems Journal, vol. 39, No. 3-4, pp. 479-510.
Sparacino, Flavia, "(Some) computer vision based interfaces for interactive art and entertainment installations," 2001, INTER_FACE Body Boundaries, Anomalie digital_arts, No. 2, Paris, France.
Leibe, Bastian et al., "Toward Spontaneous Interaction with the Perceptive Workbench, a Semi-Immersive Virtual Environment," Nov./Dec. 2000, IEEE Computer Graphics and Applications, vol. 20, No. 6, pp. 54-65.
Davis, J.W. and Bobick, A.F., "SIDEshow: a Silhouette-based Interactive Dual-screen Environment," Aug. 1998, MIT Media Lab Tech Report No. 457.
Paradiso, Joseph et al., "New Sensor and Music Systems for Large Interactive Surfaces," 2000, Proc. of the Interactive Computer Music Conference, Berlin, Germany, pp. 277-280.
Freeman, William et al., "Computer vision for interactive computer graphics," May-Jun. 1998, IEEE Computer Graphics and Applications, vol. 18, No. 3, pp. 41-53.
GroundFX Document, GestureTek (Very Vivid, Inc.), description available online at <http://www.gesturetek.com/groundfx>.
Keays, Bill, "Using High-Bandwidth Input/Output in Interactive Art," Jun. 1999, Master's Thesis, Massachusetts Institute of Technology, School of Architecture and Planning.
Utterback, Camille and Achituv, Romy, "Text Rain," 1999, art installation, available online at <http://www.camilleutterback.com/textrain.html>.
Muench, Wolfgang, "Bubbles", 1999, Prix Ars Electronica Catalog 1999, Springer-Verlag, Berlin, Germany; available online at <http://hosting.zkm.de/wmuench/bub/text>.
Demarest, Ken, "Sand," 2000, Mine Control, art installation, available online at <http://www.mine-control.com>.
Sester, Marie, "Access," 2001, Interaction '99 Biennial Catalog, Gifu, Japan, available online at <http://www.accessproject.net/concept.html>.
Wellner, Pierre, "Interacting with paper on the DigitalDesk," Jul. 1993, Communications of the ACM, Special issue on computer augmented environments: back to the real world, vol. 36, Issue 7, pp. 87-96.
Foerterer, Holger, "Fluidum," 1999, art installation, description available online at <http://www.foerterer.com/fluidum>.
Trefzger, Petra, "Vorwerk," 2000, art installation, description available online at <http://www.petracolor.de>.
Foeterer, Holger, "Helikopter," 2001, art installation, description available online at <http://www.foerterer.com/helikopter>.
Mandala Systems, "Video Gesture Control System Concept," 1986, description available online at <http://www.vividgroup.com/tech.html>.
Kreuger, Myron, "Videoplace," 1969 and subsequent, summary available online at <http://www.jtnimoy.com/itp/newmediahistory/videoplace>.
Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.
Fujihata, Masaki, "Beyond Pages," 1995, art installation, description available online at <http://http://on1.zkm.de/zkm/werke/BeyondPages>.
Rogala, Miroslav, "Lovers Leap," 1994, art installation, Dutch Electronic Arts Festival,description available online at <http://http://wayback.v2.nl/DEAF/persona/rogala.html>.
Snibbe, Scott, "Boundary Functions," 1998, art installation, description available online at <http://snibbe.com/scott/bf/index.htm>.
Snibbe, Scott, "Screen Series," 2002-2003, art installation, description available online at <http://snibbe.com/scott/screen/index.html>.
Keays, Bill, "metaField Maze," 1998, exhibited at Siggraph'99 Emerging Technologies and Ars Electronica 1999, description available online at <http://www.billkeays.com/metaFieldInfosheet1A.pdf>.

Hemmer, Raphael Lozano, "Body Movies," 2002, art project/installation, description available online at <http://wvvw.lozano-hemmer.com/eproyecto.html>.

Penny, Simon et al., "Body Electric," 2003, art installation, description available online at <http://www.neuromech.northwestern.edu/uropatagium/#ArtSci>.

Penny, Simon and Bernhardt, Andre, "Fugitive II," 2004, Australian Center for the Moving Image, art installation, description available online at <http://www.acmi.net.au/fugitive.jsp?>.

Elgammal, Ahmed et al., "Non-parametric Model for Background Subtraction," Jun. 2000, European Conference on Computer Vision, Lecture Notes on Computer Science, vol. 1843, pp. 751-767.

Stauffer, Chris and W. Eric L. Grimson, "Learning Patterns of Activity Using Real-Time Tracking," Aug. 2000, IEEE Transaction on Pattern Analysis and Machine Intelligence, vol. 22, No. 8, pp. 747-757.

Harville, Michael et al., "Foreground Segmentation Using Adaptive Mixture Models in Color and Depth," 2001, Proc. of IEE Workshop on Detection and Recognition of Events in Video, pp. 3-11.

Kurapati, Kaushal et al., "A Multi-Agent TV Recommender," 2001, Workshop on Personalization in Future TV, pp. 1-8, XP02228385.

"EffecTV" Version 0.2.0 released Mar. 27, 2001, available online at <http://web.archive.org/web/20010101-20010625re_http://effectv.sourceforge.net>.

"Index of /EffecTV," available online at <http://effectv.cvs.sourceforge.net/effectv/EffecTV/?pathrev=rel_0_2_0>.

"Supreme Particles; R111" http://www.r111.org, 1999, XP002989704.

ARTCOM: "Projekt Bodymover 2000; Koerperbewegung als Mittel zur Schaffung eines audio-visuellen Raum-Erlenbisses" http://www.artcom.de/images/stories/2_pro_bodymover/bodymover_d.pdf, 2000, XP002989289.

Penny, et al., "Traces: Wireless Full Body Tracking in the Cave," Dec. 99, Japan, ICAT Virtual Reality Conference, http://turing.ace.uci.edu/pennytexts/traces/.

Simon Penny, "Fugitive," 1995-7, http://wwvv.ace.uci.edu/penny/works/fugitive/fugitive.html.

Plasma, 3 pp, http://www.particles.de/paradocs/plasma/index.html.

Jeff Kahn, "Intelligent Room with a View," www.realtimearts.net.

"Bodymover Body Movement as a Means to Obtain an Audiovisual, Spatial Experience," 2000 ART+COM AG Berlin, http://www.artcom.de/index.php?option=com_acprojects&page=6&id=28&Itemid=144&,details=0&lang=en.

"R111, The Transformation from Digital Information to Analog Matter," http://www.r111.org.

Mathieu Lamarre, et al., "Background subtraction using competing models in the block-DCT domain," 2002, IEEE Comput Soc US, vol. 1, pp. 299-302.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No. 02739710.8, filed Jun. 4, 2002.

Affidavit of Daniel Barthels regarding EffecTV, dated May 15, 2007 (partial machine translation), cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739.

ART+COM Bodymover 2000, as downloaded on Aug. 21, 2009 from <http://www.artcom.de/index.php?option=com_acprojects&page=6&id=28&Itemid=144&details=0&lang=en>, cited during opposition of European Application No. 02739710.8, filed Jun. 4, 2002.

Article 96(2) Communication dated Feb. 25, 2005 in European Application No. 02739710.8.

Article 96(2) Communication dated Mar. 31, 2004 in European Application No. 02739710.8.

Brown, Matthew, et al. "Multi-Image Matching using Multi-Scale Oriented Patches," Technical Report, Dec. 2004, pp. 1-48, available online at <ftp://ftp.research.rnicrosoft.com/pub/tr/TR-2004-133.pdf>.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, <http://billbuxton.com/multitouchOverview.html>.

Communication dated Dec. 10, 2008 from Patentanwalt attaching article by Katy Bachman, entitled "Reactrix Up for Sale," cited during opposition of European Application No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

EffecTV Software Source: effect module, dated May 20, 2001 (German); cited during opposition of European Application No. 02739710.8, filed Jun. 4, 2002.

Extended Search Report for European Application No. 06010825.5, filed Jun. 4, 2002, dated Jul. 10, 2006.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Frisken, Sarah F. et al., "Adaptively Sampled Distance Fields: A General Representation of Shape for Computer Graphics," Jul. 23-28, 2000, Proceedings Of the 27th Annual Conference on Computer Graphics and Interactive Techniques, pp. 249-254.

Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," Oct. 23-26, 2005, ACM Symposium on User Interface Software and Technology (UIST).

Hoff, Kenneth E. III et al, "Fast and Simple 2D Geometric Proximity Queries Using Graphics Hardware," Mar. 19-21, 2001, Proc. Of the 2001 Symposium on Interactive 3D Graphics, pp. 145-148.

International Preliminary Examination Report for PCT/US2002/017843, filed Jun. 4, 2002.

International Preliminary Report on Patentability for PCT/US2004/035477, filed Oct. 25, 2004.

International Preliminary Report on Patentability for PCT/US2004/035478, filed Oct. 25, 2004.

International Preliminary Report on Patentability for PCT/US2004/041318, filed Dec. 9, 2004.

International Preliminary Report on Patentability for PCT/US2004/041319, filed Dec. 9, 2004.

International Preliminary Report on Patentability for PCT/US2004/041320, filed Dec. 9, 2004.

International Preliminary Report on Patentability for PCT/US2005/008984, filed Mar. 18, 2005.

International Preliminary Report on Patentability for PCT/US2006/030720, filed on Aug. 4, 2006.

International Preliminary Report on Patentability for PCT/US2008/059900, filed on Apr. 10, 2008.

International Search Report for PCT/US03/40321, filed Dec. 15, 2003.

International Search Report for PCT/US2002/017843, filed Jun. 4, 2002, dated Feb. 5, 2003.

International Search Report for PCT/US2004/035477, filed Oct. 25, 2004.

Invitation to Pay Additional Fees and Partial international Search Report on Patentability for PCT/US2004/035478, filed Oct. 25, 2004.

International Search Report for PCT/US2004/035478, filed Oct. 25, 2004.

International Search Report for PCT/US2004/041318, filed Dec. 9, 2004.

International Search Report for PCT/US2004/041319, filed Dec. 9, 2004.

International Search Report for PCT/US2004/041320, filed Dec. 9, 2004.
International Search Report for PCT/US2005/008984, filed Mar. 18, 2005.
International Search Report for PCT/US2006/030720, filed Aug. 4, 2006.
International Search Report for PCT/US2008/059900, filed Apr. 10, 2008.
International Search Report for PCT/US2008/10750, filed Sep. 15, 2008.
Ivars Peterson, "Artificial reality; combining a person's live video image with computer graphics suggests novel ways of working and playing with computers" Science News, Jun. 22, 1985.
Jabri, Sumer et al., "Detection and Location of People in Video Images Using Adaptive Fusion of Color and Edge Information;" presented at the Int. Conf. Pattern Recognition, Barcelona, Spain, 2000.
Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.
Katz, Itai et al., "A Multi-Touch Surface Using Multiple Cameras," Oct. 3, 2007, Advanced Concepts for Intelligent Vision Systems, vol. 4678/2007.
Kjeldesn, Rick et al., "Dynamically Reconfigurable Vision-Based User Interfaces," Apr. 2003, 3rd International Conference on Vision Systems (ICVVS '03), Graz, Austria, pp. 6-12.
Kreuger, Myron, "Videoplace—An Artificial Reality," Apr. 1985, Conference on Human Factors in Computing Systems, San Francisco, California, pp. 35-40.
Lantagne, Michel, et al., "VIP: Vision tool for comparing Images of People," Vision Interface, Jun. 11-13, 2003, pp. 1-8.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Levin, Golan "Computer Vision for Artists and Designers: Pedagogic Tools and Techniques for Novice Programmers," Aug. 2006, AI & Society, vol. 20, Issue 4, pp. 462-482.
Letter dated May 16, 2007 from Christian Zuckschwerdt regarding EffecTV, (partial machine translation), cited during opposition of European Application No. 02739710.8, filed Jun. 4, 2002.
Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.
Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application No. 02739710.8, filed Jun. 4, 2002.
Malik, Shahzad et al., "Visual Touchpad: A Two-Handed Gestural Input Device," Oct. 13-15, 2004, International Conference on Multimodal Interfaces (ICMI '04).
MacIver, Malcolm, et al., "Body Electric," Apr. 15-Jun. 29, 2003, art installation, description available online at <http://www.neurornech.northwestern.edu/uropatagiurn/#ArtSci>.
Microsoft Surface multi-touch interface table unveiled, May 30, 2007, downloaded from <http://www.dancewithshadows.com/tech/microsoft-surface.asp>.
Microsoft Surface Web Page, downloaded from <http://www.microsoft.com/surface/Pages/Product/WhatIs.aspx> on Sep. 24, 2009.
Experience Microsoft Surface, downloaded from <http://www.nnicrosoft.conn/surface/Pages/Product/Specifications.aspx> on Sep. 24, 2009.
Microsoft Surface, downloaded from <http://en.wikipedia.org/wiki/Microsoft_surface> on Sep. 24, 2009.
Mitsubishi DiamondTouch, <http://www.merl.com/projects/DiamondTouch/> visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).

Morano, Raymond A. et al., "Structured Light Using Pseudorandom Codes," Mar. 1998, IEEE Transactions on Pattern Analysis and Machine Intelligence, vol. 20, No. 3.
Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
Notice of Opposition in European Application No. 02739710.8 dated May 14, 2007.
Provision of the minutes in European Application No. 02739710.8 dated Dec. 28, 2009.
Decision revoking the European Patent in European Application No. 02739710.8 dated Dec. 28, 2009.
Observation by third party Michael Saup dated Jan. 17, 2005, cited during opposition of European Application No. 02739710.8, filed Jun. 4, 2002.
Observation by third party Petra Trefzger dated Jan. 17, 2005, cited during opposition of European Application No. 02739710.8, filed Jun. 4, 2002.
Observation by third party Simon Penny dated Jan. 17, 2005, cited during opposition of European Application No. 02739710.8, filed Jun. 4, 2002.
Reactrix, Inc. website, Mar. 28, 2003, <http://web.archive.org/web/20030328234205/http://www.reactrix.com> and <http://web.archive.org/web/20030328234205/http://www.reactrix.conn/webdemo.php>.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
Sato, Yoichi, et al., "Fast Tracking of Hands and Fingertips in Infrared Images for Augmented Desk Interface," Mar. 2000, 4th International Conference on Automatic Face-and Gesture-Recognition, Grenoble, France.
Schneider, John K., "Improved Fingerprint System Using Rolled and Multi-segmented Techniques," U.S. Appl. No. 60/575,952, filed Jun. 1, 2004, pp. 1-6.
Screenshots of Reactrix Product Demo Video, Mar. 28, 2003, <http://web.archive.org/web/20030407174258/http://www.reactrix.corn/demo/reactrix_demo.wmv>.
Sonneck, Georg, et al., "Optimized One-to-One Personalization of Web Applications using a Graph Based Model," IEEE-22, Apr. 26, 2003, 9 pgs.
Summons to Attend Oral Proceedings in European Application No. 02739710.8, dated Aug. 12, 2005.
Summons to Attend Oral Proceedings in European Application No. 02739710.8, dated Jun. 12, 2009.
Supreme Particles, "Plasma/Architexture," 1994, available online at <http://www.particles.de/paradocs/plasma/plasma_e.html>, downloaded on May 21, 2007.
Tan, P, et al., "Highlight Removal by Illumination-Constrained Inpainting," Ninth IEEE International Conference on Computer Vision, Oct. 13-16, 2003.
The History of Microsoft Surface, downloaded from <http://www.microsoft.com/presspass/presskits/surfacecomputing/docs/SurfaceHistoryBG.doc> on Sep. 24, 2009.
Torr, P.H.S. et al., "The Development and Comparison of Robust Methods for Estimating the Fundamental Matrix," Sep./Oct. 1997, International Journal of Computer Vision, vol. 24, No. 3, pp. 271-300.
Toth, Daniel et al., "Illumination-Invariant Change Detection," Apr. 2-4, 2000, 4th IEEE Southwest Symposium on Image Analysis and Interpretation, p. 3.
Vogt, Florian et al., "Highlight Substitution in Light Fields," IEEE International Conference on Image Processing, Sep. 22-25, 2002.
Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.
Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.
Written Opinion for PCT/US2002/017843, filed Jun. 4, 2002, dated Feb. 5, 2003.
Written Opinion of the International Searching Authority for PCT/US2004/035477, filed Oct. 25, 2004.
Written Opinion of the International Searching Authority for PCT/US2004/035478, filed Oct. 25, 2004.
Written Opinion of the International Searching Authority for PCT/US2004/041318, filed Dec. 9, 2004.
Written Opinion of the International Searching Authority for PCT/US2004/041319, filed Dec. 9, 2004.
Written Opinion of the International Searching Authority for PCT/US2004/041320, filed Dec. 9, 2004.
Written Opinion of the International Searching Authority for PCT/US2005/008984, filed Mar. 18, 2005.
Written Opinion of the International Searching Authority for PCT/US2006/030720, filed Aug. 4, 2006.
Written Opinion of the International Searching Authority for PCT/US2008/059900, filed Apr. 10, 2008.
International Preliminary Report on Patentability for PCT/US2008/10750, filed Sep. 15, 2008.
Letter of the opponent O2 dated May 28, 2010 in European Application No. 02739710.8, filed Jun. 4, 2002.
Notice of Opposition in European Application No. 02739710.8 dated Aug. 23, 2010.
Maria Langer, "Mac OS×10.2: Visual QuickStart Guide," Sep. 17, 2002, Peachpit Press, p. 111.

* cited by examiner

SYSTEMS AND METHODS FOR COMMUNICATION BETWEEN A REACTIVE VIDEO SYSTEM AND A MOBILE COMMUNICATION DEVICE

CROSS-REFERENCE TO RELATED APPLICATIONS

This application claims the priority benefit of U.S. provisional application Ser. No. 60/741,557 filed on Dec. 2, 2005 and entitled "Deliverance of Personalized Information and Interaction with Mobile Communications Devices on Reactive Displays," and of U.S. provisional application Ser. No. 60/817,278 filed on Jun. 28, 2006 and entitled "Using MCDs to Upload Information to an Interactive Display System," which are hereby incorporated by reference.

BACKGROUND OF THE INVENTION

1. Field of the Invention

The present invention relates generally to communication with a reactive video system, and more particularly to systems and methods for communication between a reactive video system and a mobile communication device.

2. Description of the Related Art

Conventionally, human interaction with video display systems has required users to employ devices such as hand-held remote controllers, keyboards, mice, and/or joystick controllers to control the video display systems. Recently, a new type of system for human interaction with video displays has been developed called a reactive video system. A reactive video system allows real-time, interactive and unencumbered human interaction with images generated by the system. In such a reactive video system, the location and the motions of humans or other physical objects are captured as data using a computer vision system. The captured data may then be analyzed using software and/or hardware systems to generate images using the reactive video display, including by using a projector, television display screen, liquid crystal display screen, or other video display medium that is a part of the reactive video system.

While existing reactive video systems using computer vision methods capture and analyze data representing human and/or object interactions, they do not provide for easy and/or private communications with a user. For example, it is not possible for the user to send a text message, an image or a video to a reactive video system. Furthermore, existing reactive video systems do not identify their users, and they do not individualize (i.e., personalize) the images they generate in response to specific users.

SUMMARY OF THE INVENTION

Systems and methods are provided for communication between a reactive video engine and a mobile communication device. In a system according to one embodiment, a reactive video engine is coupled to a communication interface. The communication interface is configured to facilitate communication with the reactive video engine and a mobile communication device.

DETAILED DESCRIPTION

Various embodiments include systems and methods for communication between a reactive video engine and a mobile communication device. Applications for reactive video engines are widely varied, and include advertising, video games, information browsing, product customization, branding, in-store marketing, and other commercial and non-commercial uses. Reactive video engines can be deployed in public and/or private spaces, such as malls, transit centers, retail stores, movie theaters, sports arenas, restaurants, clubs, bars, schools, and private homes.

Figure 1:
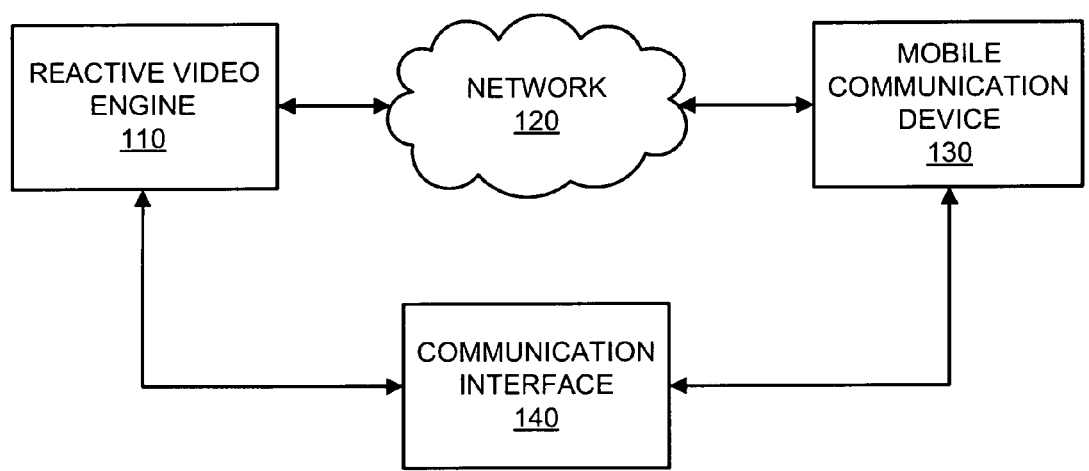
FIG. 1 illustrates an exemplary environment for communication between a reactive video engine and a mobile communication device.

FIG. 1 illustrates an exemplary environment for communication between a reactive video engine 110 and a mobile communication device 130 via network 120 and/or communication interface 140. A user can interact with the reactive video engine 110 using the mobile communication device 130 and/or by using the user's body motions. The reactive video engine 110 can generate images based on the user's interactions, and the mobile communication device 130 can detect the images. In various embodiments, the mobile communication device 130 includes a camera to detect the images. The images can comprise a barcode containing information that can be decoded by the mobile communication device 130 and/or the images can be configured to be recognized using software associated with the mobile communication device 130. The reactive video engine 110 and the mobile communication device 130 can communicate with each other using the communication interface 140 and/or the network 120.

A mobile communication device 130 comprises a device with communication functionality such as a mobile phone, a mobile computer, a personal digital assistant (PDA), an active or passive radio frequency identification (RFID) device, a hand-held video game system, and so forth. The network 120 may be any network including, but not limited to, a telephone network or a computer network (e.g., the interne, a local area network, a wide area network, and/or wireless network such as a cellular network, a WiFi network according to Institute of Electrical and Electronics Engineers (IEEE) standards 802.11a/b or g or other such wireless local area network standards, or a WiMax network according to IEEE standard 802.16 or another such wireless broadband standard).

The reactive video engine 110 can generate an image that is detected by the mobile communication device 130, and/or can generate an image of a text wherein at least part of the text can be entered by a user into the mobile communication device 130.

The communication interface 140 may comprise any device that enables direct communications between the mobile communication device 130 and the reactive video engine 110. Furthermore, the communication interface 140 may be used in conjunction with the network 120 to provide communication between the reactive video engine 110 and the mobile communication device 130. In various embodiments, the communication interface 140 may be used when short latency periods are desired for communications. For example, the communication interface 140 may provide communication using Wi-Fi according to IEEE standards 802.11a/b or g or other such wireless local area network standards, WiMAX IEEE standard 802.16 or another such wireless broadband standard, the Bluetooth® wireless technology standard IEEE 802.15.1 for wireless personal area networks (PANs) or another personal area network standard, or a wireless, infrared standard such IrDA® promulgated by the Infrared Data Association$^{SM}$. Furthermore, in various embodiments, the communication interface 140 may be configured to receive the unique electromagnetic signals emitted, for example, by mobile phones, and to excite and/or receive signals from RFID devices.

Figure 2:
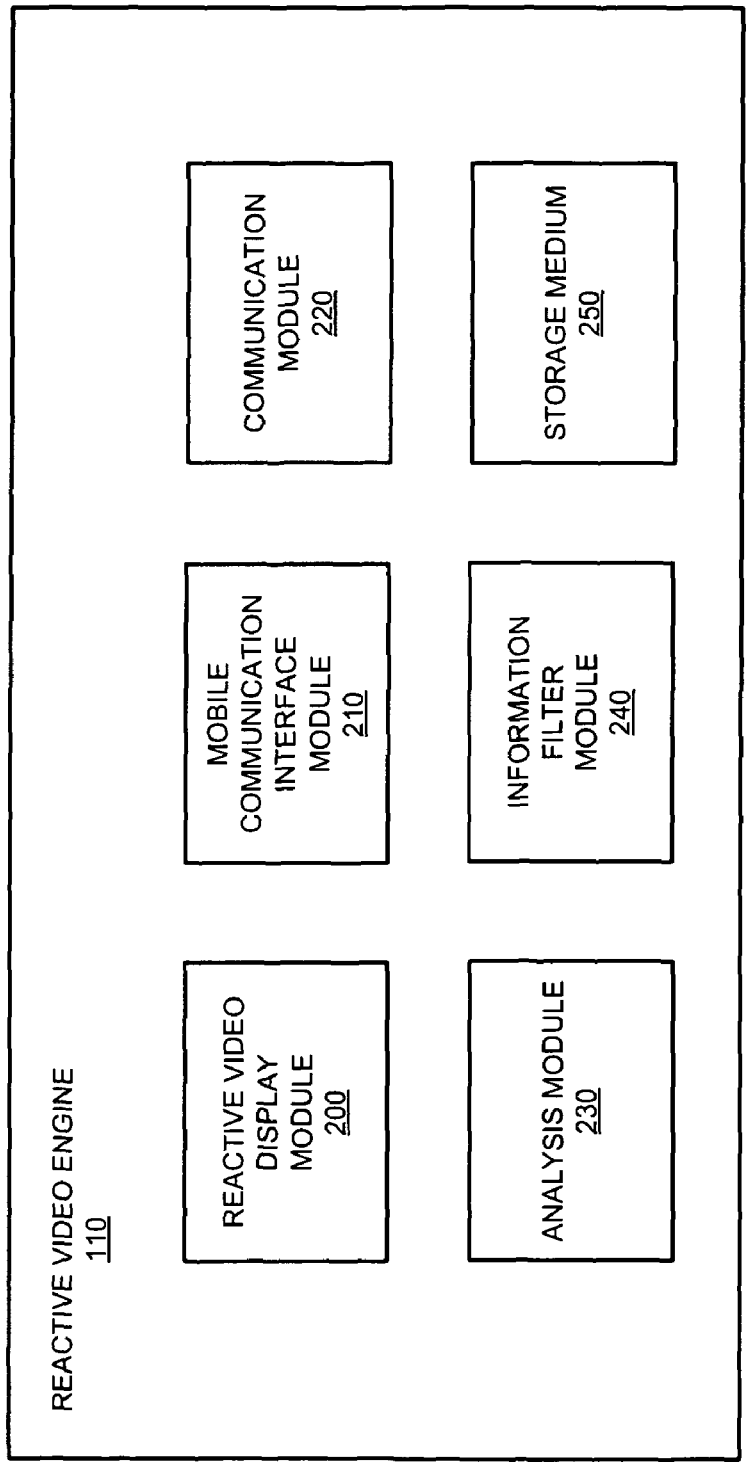
FIG. 2 illustrates a block diagram of an exemplary reactive video engine.

FIG. 2 illustrates a block diagram of an exemplary reactive video engine, such as the reactive video engine 110 discussed with reference to FIG. 1. The reactive video engine 110 comprises a reactive video display module 200, a mobile communication interface module 210, a communication module 220, an analysis module 230, an information filter module 240, and a storage medium 250. Although the reactive video engine 110 is described as comprising various components, such as the reactive video display module 200 and the mobile communication interface module 210, the reactive video engine 110 may comprise fewer or more components and still fall within the scope of various embodiments.

The reactive video display module 200 may comprise a camera, a video projector and/or another display medium, and/or a computer system configured to capture information in an interactive area. According to various embodiments, for example, the reactive video display module 200 may comprise any of the interactive video display systems (reactive video systems) disclosed in U.S. patent application Ser. No. 10/160,217, filed May 28, 2002, entitled "Interactive Video Display System," now U.S. Pat. No. 7,259,747, U.S. patent application Ser. No. 10/946,263, filed Sep. 20, 2004, entitled "Self-Contained Interactive Video Display System," U.S. patent application Ser. No. 10/974,044, filed Oct. 25, 2004, entitled "Method and System for Processing Captured Image Information in an Interactive Video Display System," now U.S. Pat. No. 7,536,032, U.S. patent application Ser. No. 10/946,084, filed Sep. 20, 2004, entitled "Self-Contained Interactive Video Display System," U.S. patent application Ser. No. 10/946,414, filed Sep. 20, 2004, entitled "Interactive Video Window Display System," now U.S. Pat. No. 7,710, 391 and U.S. patent application Ser. No. 11/083,851, filed Mar. 18, 2005, entitled "Interactive video display system," now U.S. Pat. No. 7,170,492. The entireties of the above patents and patent applications are incorporated herein by reference.

The mobile communication interface module 210 can facilitate communication between the communication interface 140 described with reference to FIG. 1 and the reactive video engine 110. The communication module 220 may also facilitate communication between the network 120 described with reference to FIG. 1 and the reactive video engine 110. In various embodiments, the communication interface 140, the mobile communication interface module 210 and/or the communication module 220 may detect the presence of the mobile communication device 130. This detection may occur passively, such as when the mobile communication device 130 emits signals that are detected within a detection zone of the reactive video engine 110, or the detection may be based on a user-initiated communication sent from the mobile communication device 130 and is received by the reactive video engine 110. Furthermore, the reactive video engine 110 can also send information to the mobile communication device 130 using the mobile communication interface module 210 and/or the communication module 220 using the communication interface 140 and/or the network 120. In exemplary embodiments, the mobile communication interface module 210 can facilitate communication between a first mobile communication device, such as the mobile communication device 130, and one or more other mobile communication devices.

As discussed herein, for example, the reactive video display module 200 can generate an image of a one-dimensional or a two-dimensional barcode, which can be detected and analyzed using a camera and software application associated with the mobile communication device 130. In various embodiments, the barcode can encode information that enables the mobile communication device 130 and/or the user to contact and communicate with the reactive video engine 110. In another example, the reactive video display module 200 can generate an image representing a unique picture, an icon, a web page Uniform Resource Locator (URL), a text string, an email address, a Common Short Code (CSC) and a keyword for use via Short Message Service (SMS), an instant message (IM) address, etc., which the user can optionally detect using the mobile communication device 130, or which the user can enter into the mobile communication device 130, as text. The images can represent specific information which can be used to access other information or a service. The images may be accessed either immediately, for example, or at a later time, or when the user is away from the reactive video engine 110.

In various embodiments, the reactive video engine 110 can receive an individualized communication from the mobile communication device 130. An individualized communication may comprise any communication or information specific to a particular user or a particular mobile communication device, such as the mobile communication device 130.

In one embodiment, the individualized communication may include the user log-in identification. For example, the reactive video display module 200 may generate an image that depicts a CSC and a keyword. In one instance, the mobile communication device 130 may comprise a mobile telephone, and the user may enter the CSC and keyword in the mobile telephone so that SMS and/or Multimedia Message Service (MMS) messages are received by the reactive video engine 110. The SMS and/or MMS message may provide the individualized communication establishing the user's identity, the reactive video engine 110 the user is located at, and/or other information.

The reactive video engine 110 can also send information to the mobile communication device 130. The reactive video engine 110 can send information in response to a previous communication received from the mobile communication device 130 or, for example, by allowing a user to use the user's body or appendages to enter the user's phone number, an instant message name, an email address, and so forth, directly into the reactive video engine 110 via body motions on a virtual keypad. The reactive video engine 110 can then communicate with the mobile communication device 130 and send the information from the user using the network 120 or the communication interface 140. According to exemplary embodiments, the SMS and/or MMS messages described herein may allow the reactive video engine 110 to facilitate sending an advertising coupon or other information to the mobile communication device 130.

A variety of different types of information may be encoded into the communication by the reactive video engine 110 and/or the mobile communication device 130. For example, the identity of the reactive video engine 110 being accessed by the user, the time and date of the user's access, and/or particular choices or selections made by the user while interacting with the reactive video engine 110 may be communicated. In an exemplary game application, the communication can include a performance of a user in the game, and whether the user won a particular sweepstakes or contest. In various embodiments, the communication may provide a full record or description of the user's interaction with the reactive video engine 110. In other embodiments, the communication may be a unique code that allows the interaction to be identified and/or retrieved from a storage medium, such as the storage medium 250.

In various embodiments, the reactive video engine 110 can display a unique session identifier (session ID), which can encode for the identity of the reactive video engine 110, the time, and other information. A user can use the session ID to log-in by using the mobile communication device 130 to communicate with the reactive video engine 110. Multiple users may be identified by providing a different session ID to each user, for example, by having one user stand in one region of the display screen while logging in, and having another user stand in a different section of the display screen while logging in. In other embodiments, the session ID can be automatically sent to the mobile communication device 130 of all users on or near the reactive video engine 110.

The log-in process can take many forms. For example, the session ID may consist of a short text string, which the user can type into the mobile communication device 130 and send as an SMS message to the reactive video engine 110. In another example, a log-in may consist of the user's mobile phone number, which is sent as part of the SMS message, and may be used to identify the user. In another example, the session ID may be encoded as text, image, or a barcode readable by a camera and software on the mobile communication device 130. Thus, the user can point the mobile communication device 130 at the text, image, or barcode, and the application on the mobile communication device 130 can automatically extract the session ID.

In another embodiment, the log-in process may be initiated by the reactive video engine 110. The reactive video engine 110 can send out a signal that can be picked up by the mobile communication device 130 of the user. If the mobile communication device 130 is a RFID device or contains a radio frequency transmitter, the reactive video engine 110 can use a group of receivers or a directional receiver to triangulate or otherwise disambiguate the position of the mobile communication device 130, and thus unambiguously identify each particular user within a group of users. In some embodiments, session IDs may be unnecessary and the reactive video engine 110 can simply send out a generic signal to trigger each mobile communication device 130 to broadcast the user identifications (users IDs) associated with the mobile communication device 130. In other embodiments, the reactive video engine 110 need not send out a signal, for example, when the mobile communication device 130 continuously sends out a unique signal which can act as a user ID.

The storage medium 250 can include, but is not limited to random access memory (RAM) and/or a read only memory (ROM). A storage device, such as a hard drive or a flash drive can comprise the storage medium 250. A database may be contained within the storage medium 250, and can provide an individualized content to the reactive video engine 110. The individualized content may comprise any communication or information specific to the particular user or the mobile communication device 130 that is stored in the storage medium 250. In exemplary embodiments, the storage medium 250 stores the communication between the reactive video engine 110 and the mobile communication device 130. In various embodiments, a full or partial record of the communication can be stored, along with the unique code identifying the interaction. According to some embodiments, access to the storage medium 250 allows the reactive video engine 110, the user, or a manager responsible for the operation and maintenance of reactive video engine 110, to use the unique code to access the record of the communication. The storage medium 250 may be located at the physical location of the reactive video display module 200 or at another location (not shown).

Users may create accounts in which the user's name, preferences, and/or statistics are linked to a unique identifier, such as a user ID that is stored in the storage medium 250. The unique identifier can take many forms, including a cell phone number, an identification code stored on the mobile communication device 130, a password that can be typed into the mobile communication device 130, or a RFID device encoded with a specific frequency. Links between unique identifiers and personal information, for example, the user's name, preferences, and/or statistics, can be stored in a database, such as storage medium 250.

In exemplary embodiments, the analysis module 230 analyzes and/or reviews the communication received from the mobile communication device 130. The communication (images, text, videos, sounds, etc.) submitted by the user can analyzed before the reactive video engine 110 generates one or more images, videos, and/or sounds based at least in part on the communication. The communication can then be incorporated into the content used to generate the one or more images. For example, an image of the user's face may be submitted and generated as an image on the display screen used by the reactive video engine 110. The reactive video display module 200 can generate arbitrary graphical content and the image of the face can be used like any other image on the display screen. For example, the image of the user's face may be shown on a head of a user-controlled video game character, or as a head of a mannequin in a clothing/dressing application. In applications where the communication is a user-submitted image of a person, for example, the analysis module 230 can include face-finding and/or facial-feature-finding functionality that can extract and/or otherwise change the image of the user's face.

The use of individualized content can be persistent. The reactive video engine 110 can implement log-in procedures. For example, when a user uses the mobile communication device 130 to send a log-in communication to a reactive video engine 110, the storage medium 250 can access the information that the user has submitted in the past. The information may be stored locally or at a central database. Thus, for example, if a user logs-in to play a game, the user's logo, character, and other user-submitted information previously submitted can be available to the reactive video engine 110. In various embodiments, user-submitted communications can be stored in a central database and tagged with a user's identification, a timestamp of the submission, and the location of the submission, allowing a network of reactive displays to have persistent access to the communications.

Since the reactive video engine 110 can be in public venues, the information filter module 240 enables the filtering (information screening) of an individualized (personalized) communication before a public display via the reactive video engine 110. The information filter module 240 reviews the individualized communication and provides a reviewed individualized communication to the reactive video engine 110.

In various embodiments, an individualized communication (e.g., images, text, videos, sounds, etc.) is reviewed by the information filter module 240 before being made public by the reactive video display module 200. The reactive video engine 110 can generate an image of a text based at least in part on the individualized communication and/or a non-text image based at least in part on the individualized communication.

The information filter module 240 can filter out inappropriate material, which may include racist, offensive, pornographic, copyrighted, trademarked, or otherwise unacceptable content. The information filter module 240 may use known automated filtering techniques that are in common use for web content, image recognition techniques, and/or other techniques. In addition, the information filter module 240 can use a manual technique, in which a person reviews and approves each user-submitted communication prior to public display. The information filter module 240 can also use a combination of automated and manual filtering techniques.

The reactive video engine 110 described with reference to FIGS. 1 and 2 can be use to implement a variety of exemplary applications, some examples of which are described herein.

For example, the reactive video engine 110 can provide a coupon to the user with the mobile communication device 130. The coupon can be either unique or non-unique to a particular user. A unique coupon code can be provided via a CSC and a keyword (or a similar method) and displayed using the reactive video display module 200. The user can enter the coupon code in the mobile communication device 130 and thereby send an SMS message to the reactive video engine 110 or to another system (not shown), which then can send a coupon back via SMS to the user's mobile communication device 130 (e.g., a mobile phone associated with the user). In various embodiments, the coupon may be in the form of a SMS message, image, or other message. The reactive video engine 110 or another system (not shown) can provide an online database, such as the storage medium 250, which can store detailed information about the user's interaction linked to the unique coupon code. Alternatively, the coupon may be encoded uniquely via a text string, image, barcode, or any of the other communication techniques described herein. To redeem the coupon at a store, the user can present the mobile communication device 130, with the stored coupon, to an employee of the store. If necessary, the employee may then verify the validity of the coupon, by accessing the database provided by the storage medium 250. The coupon can also be redeemed online. The user may type a coupon code or URL into a website of an online store, and the store can automatically check the validity of the coupon against the database provided, for example, by the storage medium 250.

According to another embodiment, the user may be randomly selected while the user interacts with the reactive video engine 110, and the user is provided with a coupon code as described herein. For identification purposes, a video camera associated with the reactive video engine 110 can take an image of the user so that the user can be distinguished from other nearby people who saw the coupon code as well.

According to another embodiment, the reactive video engine 110 can allow the user to vote or to take a survey. To prevent users from voting more than once, the user can send the user's votes and/or the user's answers through the mobile communication device 130. Thus, the reactive video engine 110 can uniquely identify the user using, for example, a mobile phone number.

According to another embodiment, the reactive video engine 110 can allow the user to view and to vote on a series of images, text strings, videos, or other content. For example, the reactive video engine 110 can provide images of buttons, allowing the user to express opinions by touching the parts of the image. Each button pressed, or otherwise selected, is perceived as a vote or a rating for the content shown. Data from the voting may be aggregated at the reactive video engine 110 and/or shared over a network a plurality of the reactive video engines 110. A central database may keep track of vote counts, and the user may submit images, text, videos and/or other content using the mobile communication device 130 to the reactive video engine 110 for incorporation into the list of images, text strings, videos, or other content being voted upon. The submissions may be sent to the reactive video engine 110, or to a network of the reactive video engines 110. The user who submits content that receives a specific number of votes can win a prize.

In another embodiment, a player of a game using the reactive video engine 110 can be provided with a unique coupon code using mobile communication device 130, as described herein, upon completion of the game. The resulting coupon may be based on the player's performance on the game. The player may win a coupon representing a special offer or a free item as a result of winning the game or achieving a particular score, for example.

In another embodiment, the reactive video engine 110 can allow users to make a set of choices. For example, users may use the reactive video engine 110 to customize a particular product. The reactive video engine 110 can provide the user with a code that either indicates the choices the user made, or a unique identifier that can be used to access a database, such as storage medium 250, that stores the user's choices. The user can use the reactive video engine 110 as a creative tool to create an image or other content. At a later time, the user can use the code or unique identifier to access the image or content the user previously created. The code may be received using the mobile communication device 130.

In another embodiment, the user can purchase an item the user views, designs, and/or customizes using the reactive video engine 110. The reactive video engine 110 can provide the user with a code that identifies the item, allowing the user to enter confidential financial information into their mobile communication device 130 to complete the purchase.

In another embodiment, the mobile communication device 130 may be used as a video game controller when the reactive video engine 110 provides a game. For example, the user playing a magic-themed game can use a combination of hand gestures and buttons on the mobile communication device 130 to cast a spell, for example, by using one particular button on the mobile communication device 130 to select a spell, and the body motions of the user's arm to aim it. The mobile communication device 130 can also direct the movements of a virtual objects or characters generated by the reactive video engine 110.

In another embodiment, using the reactive video engine 110 to play games can include games in which each user's performance history is tracked. Using the mobile communication device 130, the user could have a unique virtual character and/or set of abilities that may be associated with the user, and the reactive video engine 110 can individualize (personalize) the appearance of the unique virtual character based on preferences selected by the user. In the case of multiple users, the reactive video engine 110 can individualize (personalize) a section of the display to each user. For example, the image of a distinctive "aura" may be displayed around each user's body. If the user returns to a game previously played, the game can continue where the game left off when last played. Using the mobile communication device 130, the user can receive a code representing a promotion or prize for visiting a particular set of the reactive video engines 110. Furthermore, the using mobile communication device 130, a user can submit text, photos, or other information to the reactive video engine 110 such that text, photos, etc. appear in the game.

Figure 3:
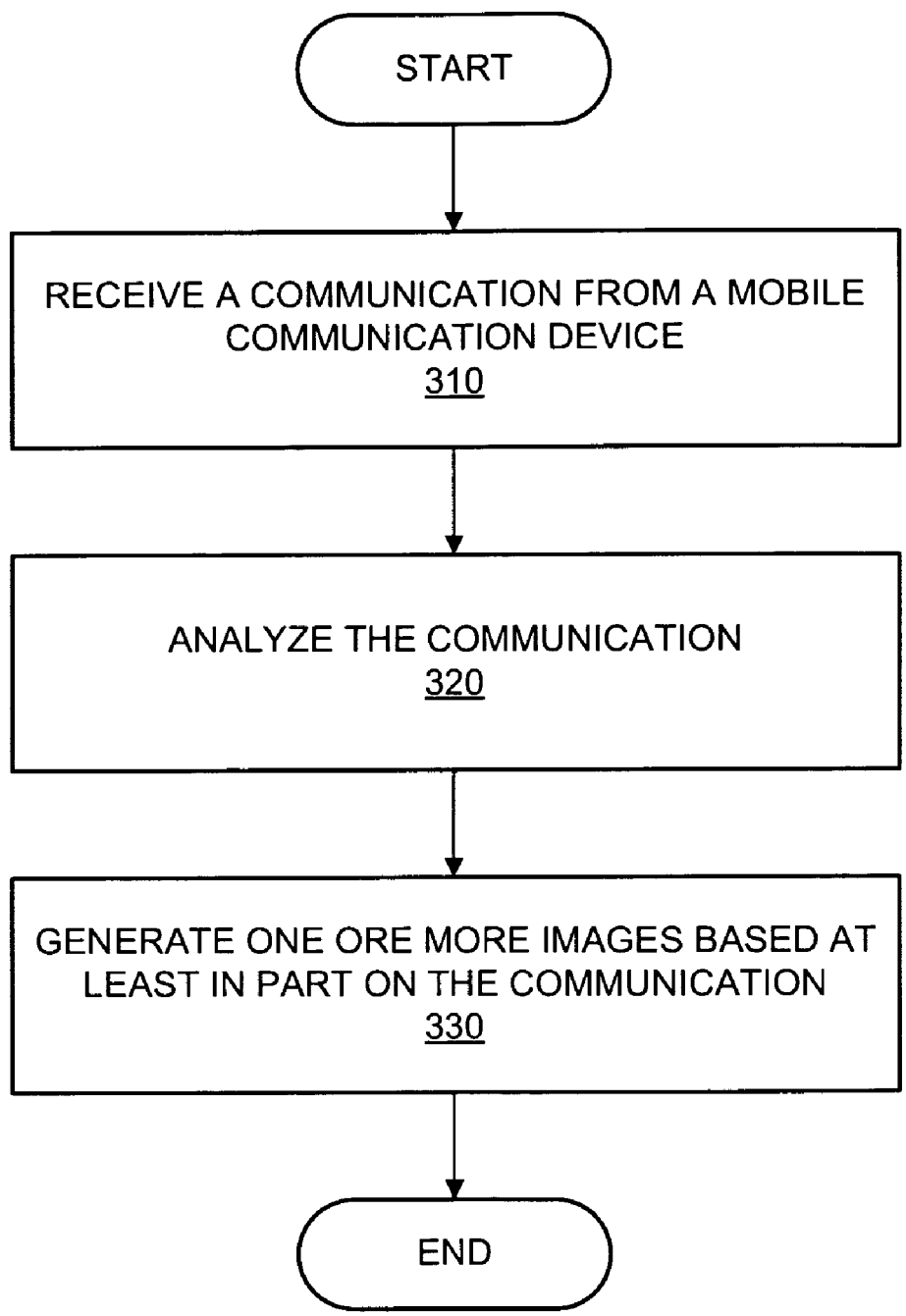
FIG. 3 illustrates a flow diagram of an exemplary process for communication between a mobile communication device and a reactive video engine.

FIG. 3 illustrates a flow diagram of an exemplary process for communication between a mobile communication device and a reactive video engine, such as the mobile communication device 130 and the reactive video engine 110. At step 310, a communication is received from the mobile communication device. As discussed herein, receiving the communication may include the use of the communication interface 140, the mobile communication interface module 210, and/or the communication module 220 and detecting the presence of the mobile communication device 130. This detection may occur passively, such as when the mobile communication device 130 emits signals that are detected within a detection zone of the reactive video engine 110, or the detection may be based on a user-initiated communication sent from the mobile communication device 130 and received by the reactive video engine 110. The user-initiated communication may be facilitated by images and/or signals emitted by the reactive video engine 110 or the communication interface 140.

At step 320, the communication is analyzed. As discussed herein, the analysis module 230 analyzes and/or reviews the communication received from mobile communication device 130. The communication, which may include images, text, videos, sound, etc., is analyzed before reactive video display module 200 generates one or more images based at least in part on the communication. Operations may be performed on the communication that may be necessary to convert the communication from one format into another format that may be needed by the reactive video engine 110. In various embodiments, where the communication is an image of a person, for example, step 320 may include functionality provided by the analysis module 230 that can include face-finding and/or facial-feature-finding functionality that can extract and/or otherwise change the image of the user's face.

At step 330, one or more images are generated using the reactive video display module 200 such that the image is based at least in part on the communication received in step 310. For example, an icon or graphic symbol may be utilized as an image on the display screen used by the reactive video engine 110. In various embodiments, the one or more images generated at step 330 may be configured to be detected by the mobile communication device 130. For example, the reactive video display module 200 can generate an image of a one-dimensional or a two-dimensional barcode, which can be detected or captured and analyzed using a camera and a software application associated with the mobile communication device 130. In other embodiments, the one or more images generated at step 330 may include an image of a text wherein at least part of the text can be entered by the user into the mobile communication device 130. For example, the reactive video display module 200 can generate an image representing a web page Uniform Resource Locator (URL), a text string, an email address, an instant message (IM) address, etc., which the user can optionally detect using the mobile communication device 130, or which the user can enter into mobile communication device 130, as text.

Figure 4:
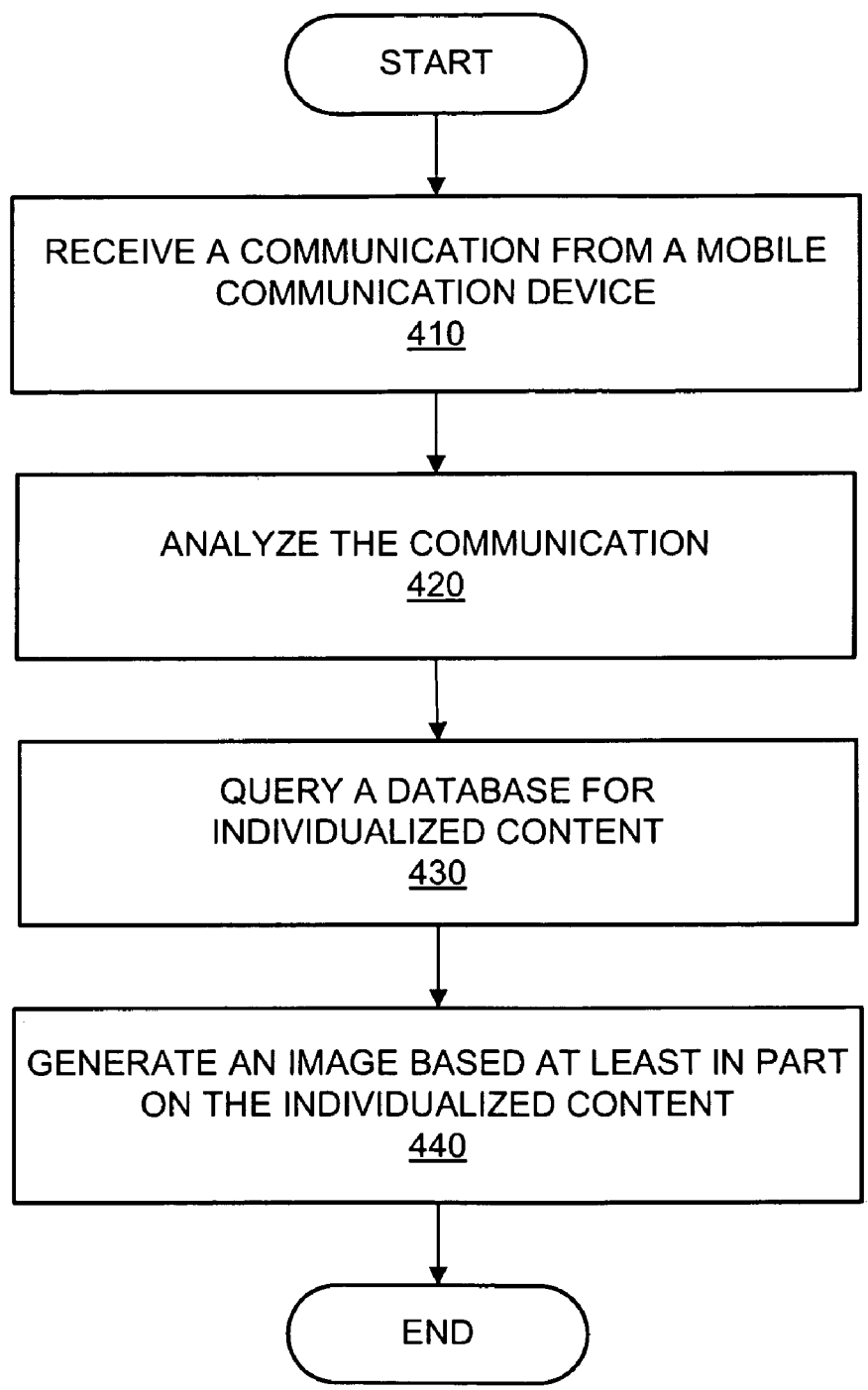
FIG. 4 illustrates a flow diagram of an exemplary process for generating an image based on individualized content.

FIG. 4 illustrates a flow diagram of an exemplary process for generating an image based on individualized content. Individualized content may comprise any communication or information specific to a particular user or the mobile communication device 130. The individualized content may be stored, for example, using the storage medium 250. In various embodiments, individualized content may include a session ID, user ID, text, image, video, and/or a sound.

At step 410, a communication is received from a mobile communication device, such as mobile communication device 130. Receiving the communication may include the use of the communication interface 140, the mobile communication interface module 210 and/or the communication module 220 and detecting the presence of the mobile communication device 130. This detection may occur passively, such as when the mobile communication device 130 emits signals that are detected within a detection zone of the reactive video engine 110, or the detection may be based on a user-initiated communication sent from the mobile communication device 130 and received by the reactive video engine 110, as discussed herein. The user-initiated communication may be facilitated by images and/or signals emitted by the reactive video engine 110 and/or the communication interface 140.

At step 420, the communication is analyzed. As discussed herein, the analysis module 230 analyzes and/or reviews the communication received from the mobile communication device 130. The communication, which may include images, text, videos, sound, etc., is analyzed before the reactive video display module 200 generates one or more images based at least in part on the communication. As discussed herein, the communication may be converted from one format into another format that may be needed by the reactive video engine 110. In exemplary embodiments where the communication is a image of a person, for example, step 420 may include functionality provided by the analysis module 230 that can include face-finding and/or facial-feature-finding functionality that can extract and/or otherwise change the image of the user's face.

At step 430, a database contained within the storage medium 250 is queried for individualized content. As discussed herein, individualized content may be a session ID, user ID, image, video, and/or a sound that was previously stored using the storage medium 250. For example, an image of a user's face can be previously stored, and the query performed at step 430 can retrieve the stored image. In another example, a database contained within the storage medium 250 can be queried for information that the user submitted in the past, such as a login communication discussed herein. Thus, for example, if the user logs-in to play a game, the user's logo, character, and/or other information previously submitted can be available to the reactive video engine 110. In various embodiments, the user's communications can be stored in a central database and tagged with the user's identification, a timestamp of the submission, and/or the location of the submission, allowing one or more reactive video engines 110 to have persistent access to the stored communications.

At step 430, an image is generated using the reactive video display module 200 such that the image is based at least in part on the individualized content. For example, the reactive video display module 200 can generate arbitrary graphical content and a previously stored image of a face can be used like any other image displayed on the display screen of the reactive video engine 110. For example, the image of the user's face may be shown on the head of a user-controlled video game character, or as the head of a mannequin in a clothing/dressing application.

Figure 5:
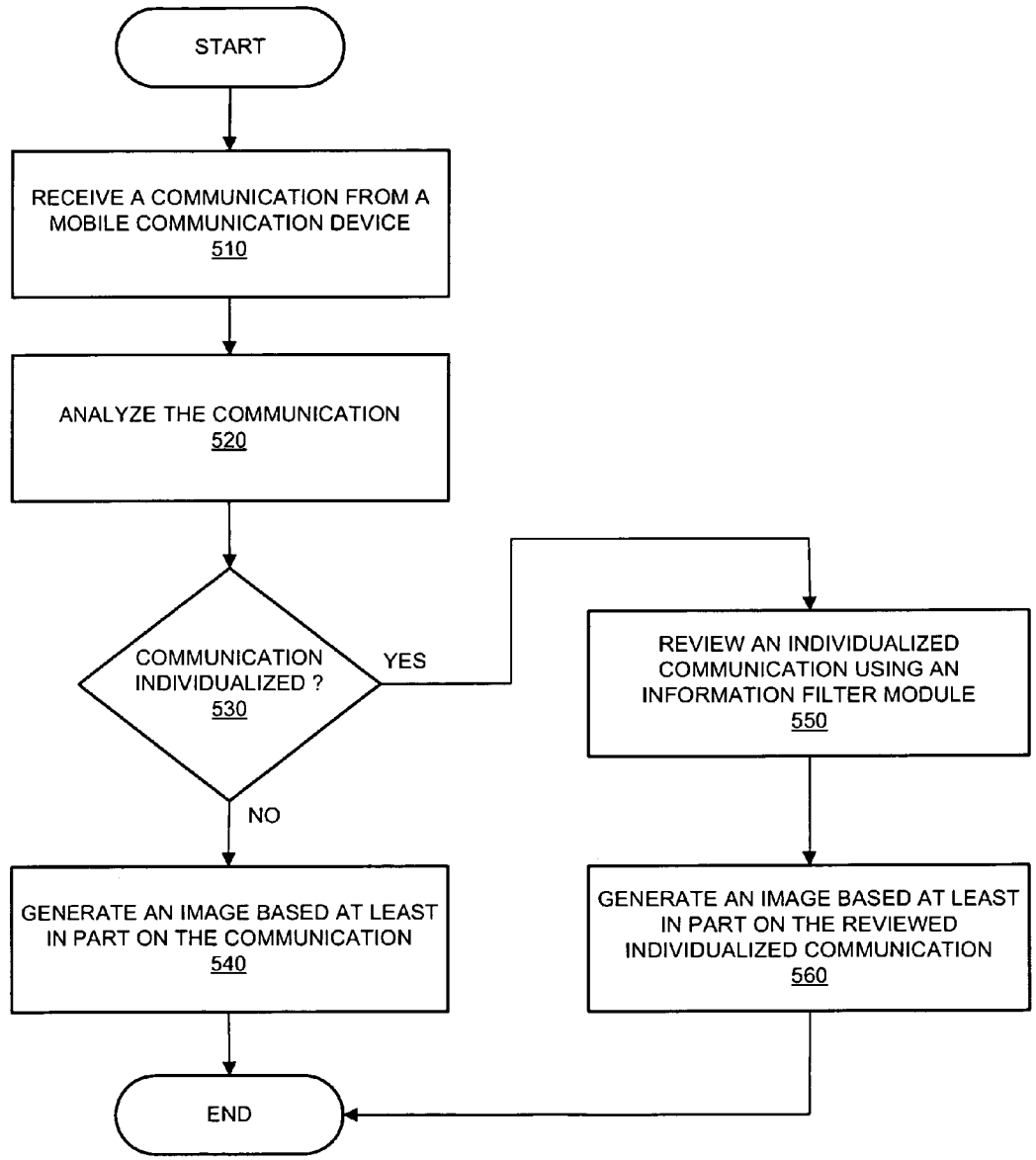
FIG. 5 illustrates a flow diagram of an exemplary process for generating an image based on an individualized communication.

FIG. 5 illustrates a flow diagram of an exemplary process for generating an image based on an individualized communication. At step 510, a communication is received from a mobile communication device, as is described with reference to step 310 in FIG. 3. At step 520, the communication is analyzed, as is described with reference to step 320 in FIG. 3.

At step 530, the reactive video engine 110 determines if the communication received from the mobile communication device 130 includes an individualized communication. An individualized communication may comprise any communication or information specific to a particular user or to the mobile communication device 130. If the communication is not individualized, at step 540 an image is generated using the reactive video display module 200 such that the image is based at least in part on the communication received in step 510. Step 540 may generate an image using the process described with reference to step 330 in FIG. 3

Step 550 is performed if the reactive video engine 110 determines that the communication received from the mobile communication device is an individualized communication. At step 550, the individualized communication is reviewed using an information filter module, such as information filter module 240. The individualized communication is reviewed using a filter and/or an information screen, as described herein. Step 550 insures that a user-submitted communication (e.g., images, text, sounds, or videos) is reviewed by information filter module 240 before being made public by the reactive video display module 200. The review performed by the information filter module 240 may be configured to filter out inappropriate material such as, for example, include racist, offensive, pornographic, copyrighted, trademarked, or otherwise unacceptable content. The review performed by the information filter module 240 may use known automated filtering techniques that are in common use for web content, image recognition techniques, and/or other techniques. In addition, the information filter module 240 can use a manual technique, in which a person reviews and approves each user-submitted communication prior to public display. The Information filter module 240 can also use a combination of automated and manual filtering techniques.

At step 560, the reactive video display module 200 generates an image of a text based at least in part on the individualized communication and/or a non-text image based at least in part on the individualized communication. For example, the image may include specific information about the user, such as images, text, sounds, or videos submitted by the user. As discussed herein, the image generated at step 560 may comprise an image of a text wherein at least part of the text can be entered by a user into the mobile communication device 130. For example, the reactive video display module 200 can generate an image representing a web page Uniform Resource Locator (URL), a text string, an email address, an instant message (IM) address, etc., which the user can optionally store using the mobile communication device 130, or which the user can enter into mobile communication device 130 as text. As discussed herein, a non-text image generated at step 560 may comprise an image of a one-dimensional or a two-dimensional barcode, which can be detected and analyzed using mobile communication device 130. For example, the when mobile communication device 130 is a mobile phone with a camera, a camera and software application in the mobile phone can detect the image generated at step 560.

Figure 6:
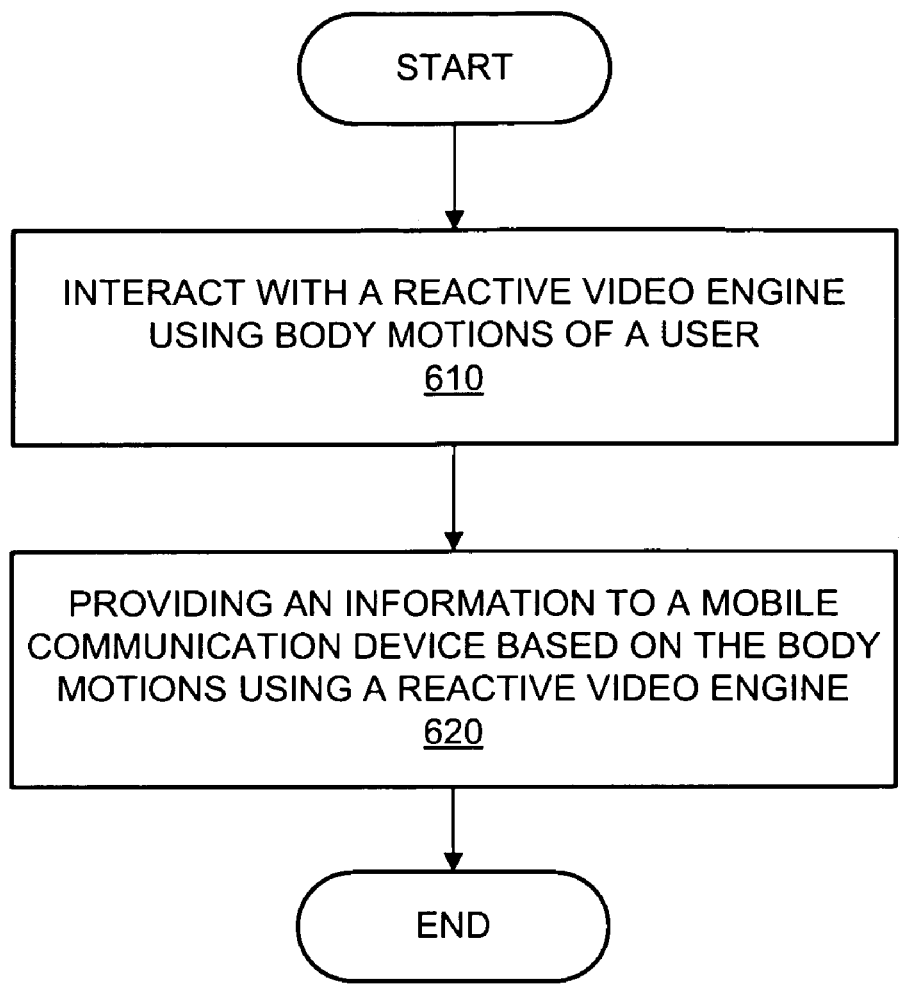
FIG. 6 illustrates a flow diagram of an exemplary process for providing an information to a mobile communication device based on body motions using a reactive video engine.

FIG. 6 illustrates a flow diagram of an exemplary process for providing an information to a mobile communication device based on body motions using a reactive video engine, such as reactive video engine 110. At step 610, the user can interact with the reactive video engine 100 by using the body motions of the user. As described herein, the reactive video engine 100 allows human interaction with images generated by reactive video engine 100. The body motions of the user, including the location and the motions of the user and of other physical objects controlled by the user, are captured as data. In one exemplary embodiment, reactive video engine 110 can interact with images of buttons allowing the users to express the user's opinions by touching the parts of the image. In another exemplary embodiment, the user playing a game can use the user's hand, other appendages or gestures that interact with the reactive video engine 110 to direct the playing of the game.

At step 620, the reactive video engine 110 provides an information to the mobile communication device based on the user's body motions using the reactive video engine 110. For example, based on the body motions of a user, the user may request information, win a game, or otherwise interact with the reactive video engine 110. As a result, the reactive video engine 110 can provide the information to a mobile communication device 130 that provides the requested information, a coupon code, a SMS or MMS message, or other information.

In exemplary embodiments, the information may comprise an image, an electromagnetic signal, and/or may be individualized to the user. As discussed herein, when the information comprises an image, the image can represent a web page Uniform Resource Locator (URL), a text string, an email address, an instant message (IM) address, etc., which the user can enter into mobile communication device 130 as text. Furthermore, a non-text image can be an image of a one-dimensional or a two-dimensional barcode, which can be detected (captured) and analyzed using a camera and software application in the mobile communication device 130. When the information comprises an electromagnetic signal, the information may comprise any of the electromagnetic signals described with reference to FIG. 1 (e.g., Wi-Fi, WiMAX, Bluetooth®, IrDA®, an RFID signal). When the information is individualized to the user, the information may comprise an individualized information. An individualized information is any communication or information specific to a particular user or to the mobile communication device 130, and is described herein with reference to FIGS. 1, 2 and 5.

While various embodiments have been described above, it should be understood that they have been presented by way of example only, and not limitation. For example, any of the elements associated with reactive video engine 110 may employ any of the desired functionality set forth herein above. Thus, the breath and scope of any particular embodiment should not be limited by any of the above-described exemplary embodiments.

What is claimed is:

1. A system comprising:
   a camera configured to capture video data of a space occupied by a user having a mobile communication device that is operable by the user;
   a display configured to present an interactive image to the user; and
   a processor configured to
      determine an identity of the user based on information transmitted by the mobile communication device;
      identify an image of at least a face of the user; and
      update the interactive image on the display to include the face of the user on a user-controlled character.

2. The system of claim 1, wherein the user may complete a purchase of a product, the product represented in the interactive image.

3. The system of claim 1, wherein the interactive image comprises a barcode.

4. The system of claim 1, wherein the interactive image comprises objects recognizable to the mobile communication device.

5. The system of claim 1, wherein at least some of the information transmitted by the mobile communication device is manually entered into the mobile communication device by the user.

6. The system of claim 1, wherein the system is further configured to initiate communication with the mobile communication device.

7. The system of claim 1, wherein the user may choose to accept the communication.

8. A method comprising:
capturing video data corresponding to an interaction between a user of a mobile communication device and a virtual object generated by an interactive video computing system;
determining an identity of the user based on the video data or information transmitted by the mobile communication device;
identifying individualized content associated with the determined identity; and
presenting an interactive image on a display that is viewable by the user in accordance with the individualized content.

9. The method of claim 8, further comprising completing a purchase of a product, the product represented in the interactive image.

10. The method of claim 8, wherein the interactive image comprises a barcode.

11. The method of claim 8, wherein the interactive image comprises objects recognizable to the mobile communication device, the mobile communication device including a camera.

12. The method of claim 8, wherein at least some of the information transmitted by the mobile communication device is manually entered into the mobile communication device by the user.

13. The method of claim 8, further comprising transmitting information to the mobile communication device.

14. A hardware computer readable storage medium having embodied thereon a program, the program being executable by a processor of a computing system in order to cause the computing system to perform operations comprising:
capturing video data including a space occupied by a user of a mobile communication device;
determining an identity of the user based on the video data or information transmitted by the mobile communication device;
identifying individualized content associated with the determined identity; and
presenting an interactive image that is customized at least partly based on the individualized content on a display.

15. The hardware computer readable storage medium of claim 14, wherein the operations further comprise completing a purchase of a product, the product represented in the interactive image.

16. The hardware computer readable storage medium of claim 14, wherein the interactive image comprises a barcode.

17. The hardware computer readable storage medium of claim 14, wherein the interactive image comprises objects recognizable to the mobile communication device.

18. The hardware computer readable storage medium of claim 14, wherein at least some of the information transmitted by the mobile communication device is manually entered into the mobile communication device by the user.

19. The hardware computer readable storage medium of claim 14, wherein the operations further comprise transmitting information to the mobile communication device.

20. The hardware computer readable medium of claim 19, wherein the user may choose to accept the transmitted information.

* * * * *

UNITED STATES PATENT AND TRADEMARK OFFICE
CERTIFICATE OF CORRECTION

| | |
|---|---|
| PATENT NO. | : 8,098,277 B1 |
| APPLICATION NO. | : 11/634044 |
| DATED | : January 17, 2012 |
| INVENTOR(S) | : Bell |

It is certified that error appears in the above-identified patent and that said Letters Patent is hereby corrected as shown below:

Page 4, item (56), under "Other Publications", in Column 1, Line 2, delete "wvvw." and insert -- www. --.

Page 4, item (56), under "Other Publications", in Column 1, Line 18, delete "IEE" and insert -- IEEE --.

Page 4, item (56), under "Other Publications", in Column 1, Line 36, delete "wwvv." and insert -- www. --.

Page 4, item (56), under "Other Publications", in Column 1, Line 43, delete "Itemid=144&," and insert -- Itemid=144& --.

Page 4, item (56), under "Other Publications", in Column 1, Line 72, delete "rnicrosoft" and insert -- microsoft --.

Page 5, item (56), under "Other Publications", in Column 1, Line 55, delete "neurornech." and insert -- neuromech. --.

Page 5, item (56), under "Other Publications", in Column 1, Line 56, delete "uropatagiurn" and insert -- uropatagium --.

Page 5, item (56), under "Other Publications", in Column 1, Line 64, delete "nnicrosoft.conn" and insert -- microsoft.com --.

Page 5, item (56), under "Other Publications", in Column 2, Line 24, delete "conn/" and insert -- com/ --.

Signed and Sealed this
Third Day of July, 2012

David J. Kappos
*Director of the United States Patent and Trademark Office*

CERTIFICATE OF CORRECTION (continued)
U.S. Pat. No. 8,098,277 B1

Page 5, item (56), under "Other Publications", in Column 2, Line 38, delete "corn/" and insert -- com/ --.

Column 12, line 54, in Claim 1, delete "configured to" and insert -- configured to: --.